Nov. 1, 1938.   F. E. SWAIN   2,135,243
FUEL FEED SYSTEM FOR INTERNAL COMBUSTION ENGINES
Filed Nov. 26, 1937
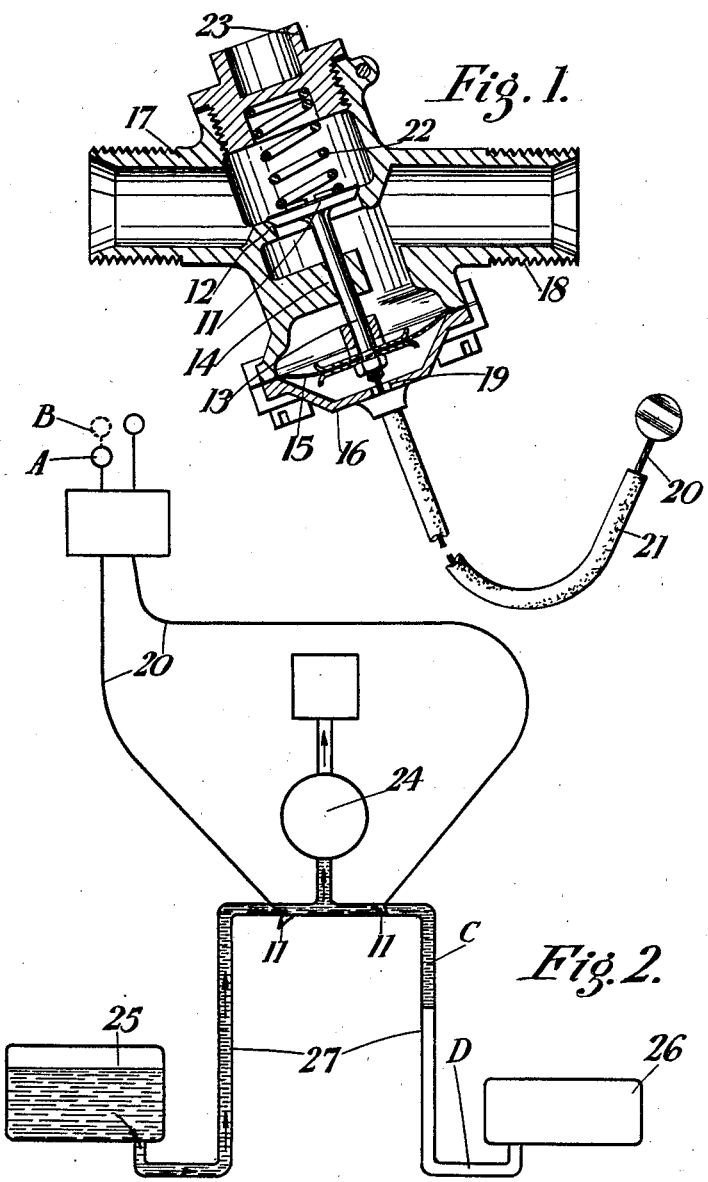
Inventor
Frank Edward Swain
by Mawhinney & Mawhinney
Attorneys.

Patented Nov. 1, 1938

2,135,243

UNITED STATES PATENT OFFICE 2,135,243

FUEL FEED SYSTEM FOR INTERNAL COMBUSTION ENGINES

Frank Edward Swain, Ewell, England, assignor of one-half to Kevitt Rotherham, Coventry, England Application November 26, 1937, Serial No. 176,708
In Great Britain November 11, 1936

4 Claims. (Cl. 158—36)

This invention relates to the fuel-feed systems of internal-combustion engines, and particularly of aircraft engines, where fuel is pumped to the carburetor (or carburetors) from a fuel tank or other reservoir which is disposed so as normally to be beneath the pump.

In such cases there is a tendency at times (for example, when the aircraft is diving) for the fuel to be fed to the pump under a pressure head, which causes excess pressure on the inlet side of the pump. It is one object to obviate this disadvantage.

Furthermore, in cases where there are at least two fuel reservoirs from which a single fuel pump can be supplied (or two or more pumps in parallel), it is desirable, when one reservoir becomes empty, that a visual indication of this fact should be given and that the reservoir should be isolated from the rest of the system. It is a further and important object to arrange for this to be effected automatically.

Broadly speaking, the fuel-feed system, according to the invention, has interposed between a fuel reservoir and fuel pump an automatic valve controlled by the pressure at the inlet side of the pump. (Such valve is, of course, quite independent of the inlet valve of the pump.)

In a preferred arrangement according to the invention, the fuel-feed system has interposed between the fuel reservoir and fuel pump a valve which is biased to the closed position and maintained open (while the conditions are appropriate) by a diaphragm which responds to the depression at the inlet side of the pump.

The invention further consists in a fuel-feed system, for an internal-combustion engine, including at least two fuel reservoirs of different capacities connected to a fuel pump and automatic valves in the respective connections each of which is biased to the closed position and incorporates a pressure-responsive means such as a diaphragm which is subjected to the pressure at the inlet side of the pump when the valve is open to hold the valve open as long as fuel is being pumped from the associated fuel reservoir—that is to say, as long as the pump is working correctly and the reservoir is not empty, and as long as the reservoir is not raised relatively to the pump so as positively to feed fuel thereto.

In the accompanying drawing:—

Figure 1 is a section through one form of automatic valve for use according to the invention; and Figure 2 is a diagrammatic layout of a fuel-feed system incorporating two fuel tanks and an automatic valve in the connection from each to the pump.

In the construction of Figure 1, for a fuel-feed system for an aircraft engine, the valve has a movable valve member 11 of mushroom form coacting with a seat 12 in the valve casing, the stem 13 of the movable valve member being slidingly guided in a supporting part 14 of the casing. The end of the stem remote from the head is secured to a pressure-responsive means here shown as a diaphragm 15 the margin of which is secured to the casing in any convenient manner, as by being clamped between a cover 16 and the main part of the casing. The outlet end 17 of the valve casing is adapted, as by being screw-threaded, for connection to the pump inlet and the inlet side 18 of the valve casing, which is adapted in a similar manner for connection to the fuel reservoir or tank, is in communication with the upper side of the diaphragm and with the underside of the head of the movable valve member. The other side of the diaphragm is in communication with the atmospheric pressure, as by means of the opening 19. The effective area of the diaphragm is greater than that of the head of the movable valve member.

In operation, when the fuel pump supplying the carburetor(s) is initially started the sub-atmospheric pressure at the inlet side thereof is applied to the head of the movable valve member. This will be raised only if the pump is capable of creating sufficient suction. A manual control may be provided for the purpose of opening the valve, and the drawing shows a diagrammatic form of control 20 movable along a flexible casing 21 and adapted to bear on the end of the stem 13 when the control is pushed along the casing. If the movable valve member be initially raised by the control in this way, the latter will serve to indicate the subsequent closure of the valve by the different position it will occupy; it being understood that it may be spring pressed or otherwise biased to follow the movements of the movable valve member in this way. Figure 2 shows the two positions of the control, A being the position when the valve is open and B when closed.

Once the valve has been opened manually, the diaphragm will respond to a sub-atmospheric pressure but slightly below atmospheric to maintain the valve open. At any time, however, when fuel is being fed under a pressure head through the valve, as when the aircraft is diving, the movable valve member at once closes and remains closed until such time as the pump has again built up a predetermined sub-atmospheric pressure at its inlet side. Naturally, when the aircraft ceases diving, the pressure head at the inlet side 18 of the valve is removed. The stress of the closing spring 22 can be adjusted by means of the screwed cap 23.

With regard to the layout of Figure 2, where the two valves 11 are assumed to be as first described above with reference to Figure 1, it is intended that both valves should first be opened manually until such time as the pump 24 creates sufficient suction to lift the fuel from both tanks 25, 26. So soon as the pipe lines 27, 27 are primed both valves will remain open automatically. Both will close if the aircraft dives, and open automatically, as above described, when the conditions are again appropriate. The tank 26 being of smaller capacity than the tank 25 will be the first to empty, and as soon as the fuel is exhausted the suction in the pipe line will fall and the right-hand valve 11 will close automatically, as shown in the layout of Figure 2, whereupon the small portion of fuel left behind at C will, of course, fall to the bottom D of the pipe line. The pump suction is then applied to the head of the movable valve member of the right-hand valve, but this suction is limited so long as fuel is being drawn from the other tank 25, and therefore will not open the movable valve member of the right-hand valve. The maximum pump suction will act upon the two movable valve members only when both valves are in the closed position, and as it would tend to open the closed valve it is essential that this should be locked in the closed position by the pilot, or an equivalent operation effected, to maintain the empty tank isolated, when the valve closes in conditions other than those due to an excessive pressure head.

When the right-hand valve closes, the position of the manual control indicates to the pilot that the right-hand tank 26 is empty.

Thus, by the invention one can prevent in a very simple manner the possibility of any pressure rise occurring in the pipe line at the inlet side to the fuel pump if the fuel reservoir happens momentarily to be above the fuel pump. Furthermore, on one of a plurality of tanks emptying it is automatically isolated.

What I claim as my invention and desire to secure by Letters Patent of the United States is:—

1. For an internal-combustion engine, a fuel-feed system including a fuel pump, at least two fuel reservoirs preferably of different capacities and normally disposed at a level below that of the fuel pump, and automatic valves in the respective connections of the fuel reservoirs to the fuel pump, each of said valves comprising a movable member exposed at one side to the fuel pump suction and biased to the closed position, and a pressure-responsive means connected to said valve member, at the other side, the effective area of said pressure-responsive means being greater than the effective area of said valve member, both valve members being exposed simultaneously to the suction of the fuel pump and disposed relatively to the fuel pump suction to both open in the direction of such suction.

2. For an internal-combustion engine, a fuel-feed system including a fuel pump, at least two fuel reservoirs preferably of different capacities and normally disposed at a level below that of the fuel pump, and automatic valves in the respective connections of the fuel reservoirs to the fuel pump, each of said valves comprising a mushroom-shaped valve member which is biased to the closed position opening toward the fuel pump, and a diaphragm connected to the stem of the valve member, said diaphragm having its margin secured to the valve casing and being exposed on the side adjacent the head of the valve member to the pressure at the inlet side of the valve, while the other side of the diaphragm is exposed to atmospheric pressure.

3. For an internal-combustion engine, a fuel-feed system including a fuel pump, at least two fuel reservoirs of different capacities and normally disposed at a level below that of the fuel pump, and automatic valve in the respective connections of the fuel reservoirs to the fuel pump, each of said valves comprising a movable valve member which is biased to the closed position and opens toward the fuel pump a diaphragm adapted to respond to the pressure at the inlet side of the pump and connected to hold the movable valve member open, when it is open, as long as fuel is being pumped.

4. A fuel-feed system, according to claim 3, further including means to initially open the valves at periods of low suction conditions in the fuel pump, and indicating means associated with said last-named means to show the exhausted condition of a tank by the closed position of its valve.

FRANK EDWARD SWAIN.